Figure 1:
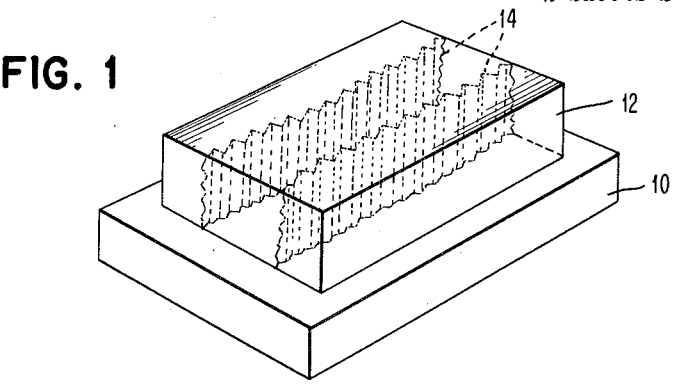

Nov. 16, 1965    L. I. MAISSEL    3,218,194
METHOD OF STABILIZING REFRACTORY METAL FILM RESISTORS
Filed April 19, 1962    2 Sheets-Sheet 1

INVENTOR
LEON I. MAISSEL
BY George O. Daile
ATTORNEY

Nov. 16, 1965     L. I. MAISSEL     3,218,194
METHOD OF STABILIZING REFRACTORY METAL FILM RESISTORS
Filed April 19, 1962     2 Sheets-Sheet 2

United States Patent Office 3,218,194
Patented Nov. 16, 1965

3,218,194
**METHOD OF STABILIZING REFRACTORY
METAL FILM RESISTORS**
Leon I. Maissel, Poughkeepsie, N.Y., assignor to International Business Machines Corporation, New York, N.Y., a corporation of New York
Filed Apr. 19, 1962, Ser. No. 188,673
14 Claims. (Cl. 117—217)

This invention relates to thin film refractory metal resistors, and more particularly, to a method for rapidly stabilizing the resistance films to the desired sheet resistivity.

A concentrated effort is under way in all segments of the industry to reduce the size and weight of electronic assemblies. One of the approaches is in the thin film area. Passive elements, such as resistors and capacitors, of micro-miniaturized electronic networks may be formed onto a suitable substrate. Refractory metal films, such as tantalum, tungsten, rhenium and titanium, are well-known for their high annealing temperatures. This property has stimulated much interest in them for use as thin film resistors.

The resistance of deposited refractory metal films, however, increases on heating in air at a steadily decreasing rate for a considerable length of time. This problem is attributed in part to traces of oxygen and water vapor trapped in the refractory metal film when laid down and in part to atmospheric oxygen diffusing into the grain boundaries of the refractory metal film causing oxidation. Oxidation of the refractory metal in the grain boundary areas of the film increases the resistance of the film. There will be traces of oxygen and water vapor trapped in the deposited refractory metal film when laid down, despite the flushing of the vacuum chamber and the inert atmosphere or evacuated space used during cathode sputtering or vacuum evaporation procedures. Stabilization of the refractory metal film can be accomplished only by a long time consuming period of annealing. The final sheet resistance value is, however, unpredictable.

It is thus an object of this invention to provide a method for manufacturing an acceptable thin film refractory metal resistor.

It is a further object of this invention to provide a method for rapidly and cleanly stabilizing a refractory metal thin film resistor to the desired sheet resistivity.

These and other objects are accomplished in accordance with the broad aspects of the present invention by depositing a refractory metal over a suitable substrate and subjecting the refractory metal to a diffusion of a quantity of diffusing metal into the grain boundaries of the metal which substantially fills the boundaries. The formation of thin film resistors includes first depositing a layer of refractory metal by conventional cathode sputtering or vacuum evaporation techniques upon a suitable substrate. Grain boundaries are present in the layer of refractory metal. It is known that atoms of diffusing material move into the grain boundaries more rapidly than in the bulk material. These grain boundaries thus serve as avenues for impurities into the refractory metal layer. An oxidation resistant metal, such as gold, platinum, silver or palladium, is applied within or on the surface of the refractory metal. The combination of metals is heated in a vacuum at an elevated temperature for several hours until the oxidation resistant metal film has completely diffused into and substantially filled the grain boundaries of the refractory metal film. In this manner the stabilization of the film resistance is accomplished.

The foregoing and other objects, features and advantages of the invention will be apparent from the following more particular description of the preferred embodiments of the invention as illustrated in the accompanying drawings.

Figure 2:
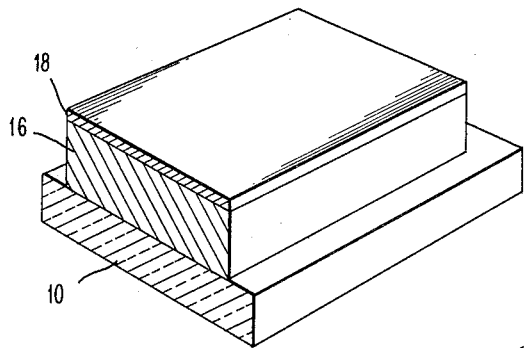
Figure 3:
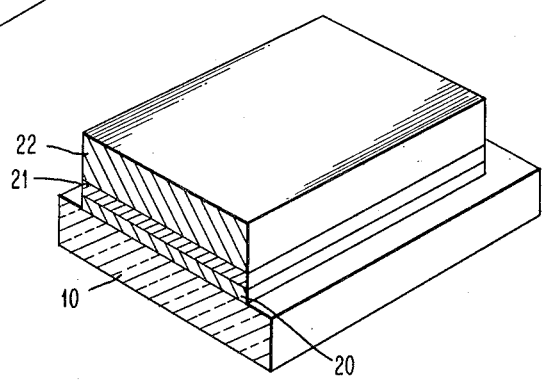
Figure 4:
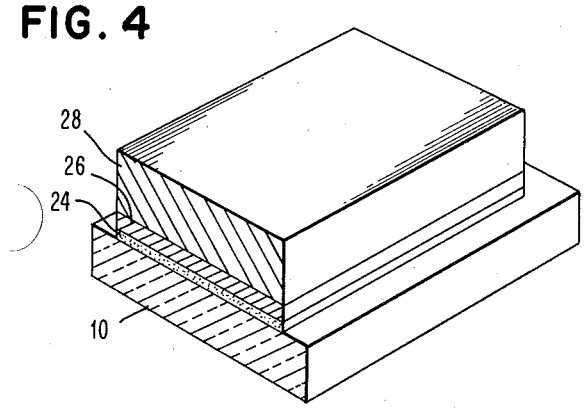
Figure 5:
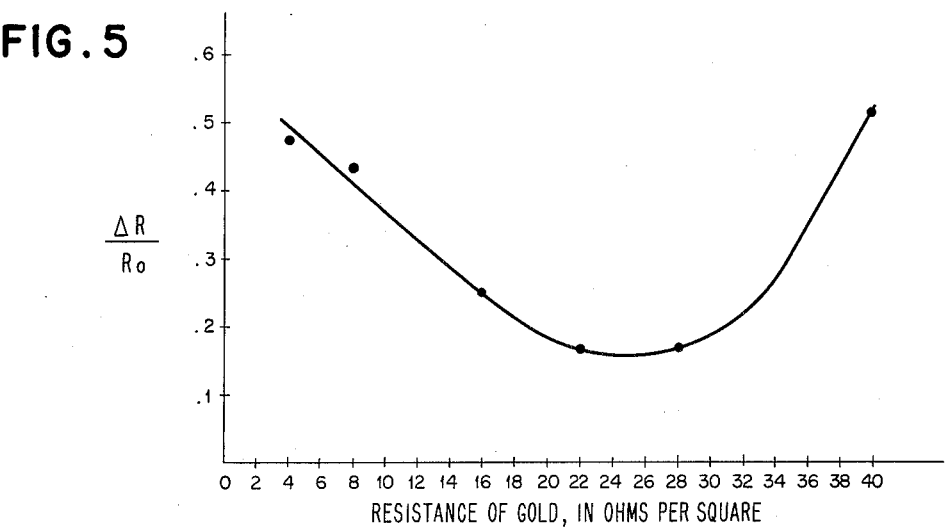
Figure 6:
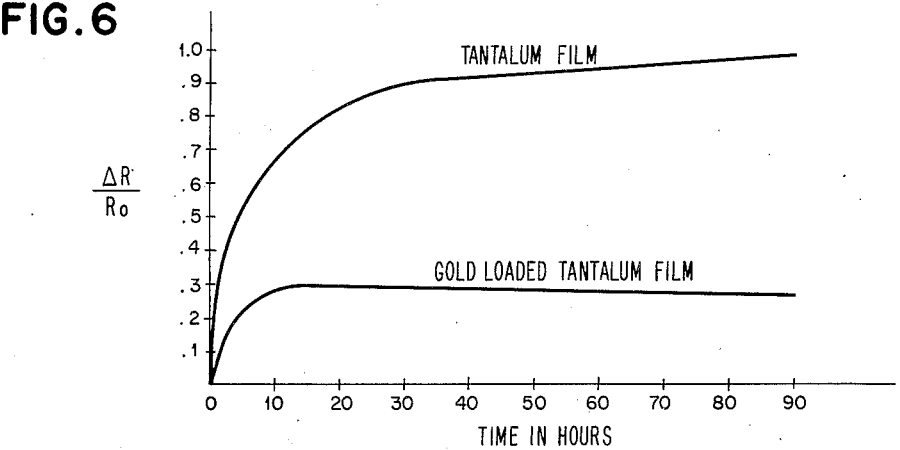
Figure 7:
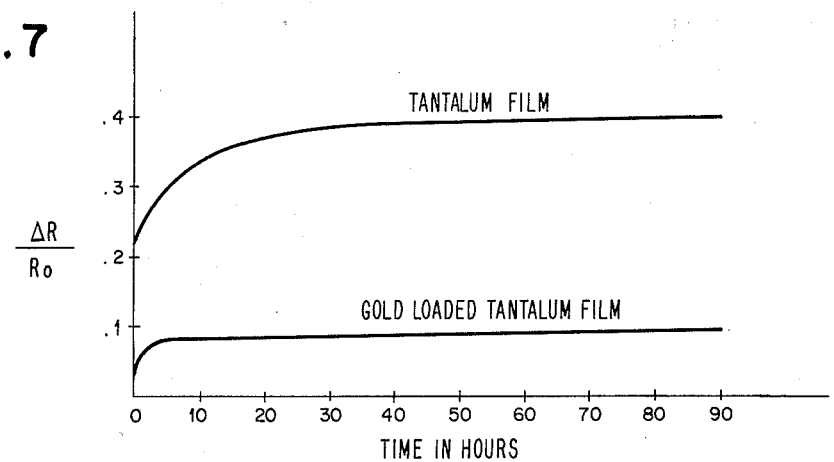

In the drawings:
FIGURE 1 is a perspective view of the thin film resistor of the present invention illustrating the grain boundaries within the refractory metal;
FIGURES 2, 3 and 4 are views of the thin film resistor of the invention illustrating alternate embodiments of the invention at an intermediate stage of its production;
FIGURE 5 is a graph useful in determining the optimum quantity of the diffusing metal used in the stabilization method;
FIGURE 6 is a graphical representation comparing the time for stabilizing an unloaded tantalum resistance film to a gold loaded tantalum resistance film prepared using the FIGURE 2 source technique; and,
FIGURE 7 is a graphical representation comparing the time for stabilizing an unloaded tantalum resistance film to a gold loaded tantalum resistance film prepared using the FIGURE 3 source technique.

Referring now, more particularly, to FIGURE 1 there is illustrated in a thin film refractory metal resistor having its grain boundaries 14 filled with a diffusing metal, such as gold, silver, palladium or platinum. There is shown a substrate 10 upon which the refractory metal layer 12 has been deposited by any of the conventional depositing techniques, such as cathode sputtering or vacuum evaporation. The substrate 10 must have the properties of high electrical insulation, mechanical strength and good mechanical bonding to the metal layer to be applied thereover. Examples of substrates having these properties include high purity, chemically resistant glasses and certain ceramics.

The refractory metal resistive film is condensed upon the substrate by the method, that is cathode sputtering or vacuum evaporation, most adaptable to the particular metal. Metals with low vapor pressures, such as tantalum, are conveniently deposited by cathode sputtering. Others having higher vapor pressures, for example, titanium, are satisfactorily condensed on the substrate by vacuum evaporation.

Following the deposition of the refractory metal, whether by cathode sputtering or vacuum evaporation, the metal is subjected to a diffusion of a sufficient quantity of a diffusing metal into and filling its grain boundaries. The quantity of diffusing metal used must be such that when it diffuses into the refractory metal it substantially fills the grain boundaries. If too large a quantity is used, the diffusing metal out-diffuses on standing to give a coating of the diffusing metal on the surface of the film resistor. If too little diffusing metal is used, the full value of the novel invention which reduces the stabilization time of the thin film resistor would be lost. There are several possible configurations as to the source of the diffusing metal.

FIGURE 2 illustrates a first embodiment where a deposit of a refractory metal 16 is made on substrate 10 in the vacuum chamber of a cathode sputtering or vacuum evaporation apparatus. The deposit is made to the thickness required to produce the resistance value desired. A layer of diffusing metal 18 of optimum thickness is then applied over the refractory metal film without breaking the vacuum by the same technique that the refractory metal was deposited. The layer 18 is then the diffusing source.

The FIGURE 3 embodiment which may be termed the "sandwich" configuration is prepared by depositing a first layer 20 of the refractory metal upon the substrate 10. A layer of diffusing metal 21 of optimum thickness is deposited over the refractory metal film while maintaining the vacuum in the depositing chamber. The remaining refractory metal layer 22 is laid over the diffusing metal layer to the thickness needed to make the combined layers 20 and 22 the desired resistance value.

The use of the sandwiched diffusing metal source has several important advantages and, therefore, is a preferred embodiment of this invention. There being less distance for the diffusing metal to travel, the grain boundaries will be filled sooner than the FIGURE 2 embodiment. The trapped oxygen and water vapor in the refractory metal film will thus have less time to migrate to the grain boundary areas and there cause oxidation. Further, the diffusing metal diffuses in part into the refractory metal body while the second film 22 is being deposited.

The embodiment illustrated in FIGURE 4 utilizes an underlayer diffusing metal source 26. A coating 24 is required where the diffusing metal is such that it does not adhere well to the substrate used. Bismuth oxide could be used as the coating 24 where, for example, the substrate 10 is glass and the diffusing metal layer 26 is gold. The diffusing metal source 26 is then deposited over the substrate directly on the coating, if necessary, and the refractory metal film 28 deposited thereover.

A further embodiment which is not illustrated in the drawings is the deposit of a homogeneous layers of the refractory and the diffusing metals. This is accomplished by using a depositing source, such as the cathode in the cathode sputtering procedure, which is a mixture of the required metals in the optimum proportions. Since the diffusing metal is evenly dispersed throughout the refractory metal film, the distance for the diffusing metal to travel to the grain boundaries during the diffusing step is short. The refractory metal resistor may then be rapidly stabilized.

The combination of refractory metal plus the diffusing metal source made by any of the techniques described in the preceding paragraphs is then placed in a vacuum and heated for several hours to an elevated temperature that will promote diffusion. The heating may be discontinued when there is no visual traces of diffusing metal on the surface of the refractory metal where the source of the diffusing metal may be readily seen. The diffusing metal has thus diffused and substantially filled the grain boundaries within the refractory metal film. The refractory metal film resistor has its original sheet resistivity and prolonged heating in air now produces little or no change in resistance.

The quantity of diffusing metal that is used as the source is somewhat critical and may be determined empirically. As series of thin film resistors was prepared according to the FIGURE 3 sandwich technique. Tantalum was used as the refractory metal and was sputtered to a total thickness of the two layers such that the total resistance was 50 ohms per square. The thickness of a resistance film is inversely proportional to its resistance in ohms per square area and will hereinafter, for convenience, be expressed in terms of its resistance. Gold was used as the diffusing metal and was varied in thickness from 4 to 40 ohms per square. The thickness of the diffusing gold layer may be alternatively expressed in terms of percent thickness of the diffusing layer portion of the composite refractory and diffusing metal layer. The diffusing metal range of 4 to 40 ohms per square of gold compares 44 to 4.5 percent thickness of the diffusing metal layer to the composite. The sandwich articles were placed for about one hour in a vacuum oven maintained at approximately 500° C. All of the gold by this time was diffused into the grain boundaries of the tantalum film. The thin film resistors were then heated for twenty hours at 250° C. in air. The resistance of each resistor was taken prior to and after the twenty hours of heating. The change in resistance $\Delta R$ was divided by the initial resistance $R_0$ in each case and plotted against the thickness of the gold layer in ohms per square in FIGURE 5. This empirical test shows that the best stability for a 50 ohms per square tantalum film is obtained using from a 19 to a 30 ohms per square or 9.2 to 5.8 percent thickness layer of gold as the diffusing metal. Where thicker or thinner resistance layers of tantalum are used, the thickness of the gold layer should be proportionately increased or decreased.

Listed below are two examples of the present invention in detail. These examples are included merely to aid in the understanding of the invention, and variations may be made by one skilled in the art without departing from the spirit and scope of this invention. Thicknesses in the following examples are expressed in terms of their resistances, for convenience. The thickness of a resistance film is inversely proportional to its resistance in ohms per square area.

*Example 1*

A high purity, chemically resistant glass substrate 10 was thoroughly cleaned, rinsed in distilled water and dried. The substrate was placed on the platform in the standard cathode sputtering apparatus. The vacuum chamber of the cathode sputtering apparatus was evacuated, flushed with argon, and the chamber was then reevacuated to a high vacuum. The cathode which was composed of tantalum in this example was made electrically negative with respect to the remainder of the apparatus. The voltage was increased and cathode sputtering was accomplished producing a layer of tantalum of 50 ohms per square. A layer of gold of 5 ohms per square was then deposited over the tantalum layer by means of cathode sputtering. The layer of gold was deposited over the tantalum with minimum delay and without breaking the vacuum in the apparatus. The combination was then from the cathode sputtering apparatus and placed in a vaccum oven and heated to approximately 500° C. and held there for several hours until the gold layer had disappeared from the surface of the tantalum layer.

A control tantalum film resistor was made under the same conditions except for the application of a layer of gold on the tantalum film just described in the preceding paragraph. The control tantlum film resistor and the gold loaded tantalum film resistor were measured for their resistances. The two resistors were then placed in an oven held at 250° C. and the relative change in resistance versus time in the oven was recorded over a ninety hour period of time. The change in resistance $\Delta R$ divided by the original resistance $R_0$ rapidly stabilized for the gold loaded tantalum film resistor as compared to the length of time required to stabilize the unloaded tantalum film resistor and the results are shown as FIGURE 6.

*Example 2*

The procedure of Example 1 was followed with the exception that a sandwiched gold source as shown in FIGURE 3 was used rather than the over layer gold source of FIGURE 2. The total tantalum thickness of the two layers 20 and 22 was 50 ohms per square. The sandwiched gold layer was 12.3 ohms per square. The combination of layers or sandwich was placed in a vacuum oven and heated at approximately 500° C. for about 1 hour. The gold layer was completely diffused into the tantalum metal.

The original resistance $R_0$ of this gold loaded tantalum resistor film along with a control tantalum resistor film was measured. The two film resistors were then placed in an oven maintained at approximately 250° C. and the change in resistance $\Delta R$ divided by the original resistance $R_0$ was obtained versus time in hours over a ninety hour period for each resistor and the results are shown as FIGURE 7. The gold loaded resistor quickly became stabilized while the pure tantalum resistor took a great deal longer to become stabilized.

The invention thus provides a procedure for making thin film resistors from refractory metals. The resistors are stable even after heating for long periods of time. The stabilization procedures used to produce these thin film resistors of high stability are rapidly and cleanly effected and are readily adaptable to large scale manufacturing procedures.

While this invention has been particularly shown and described with reference to preferred embodiments thereof, it will be understood by those skilled in the art that various changes in form and details may be made therein without departing from the spirit and scope of the invention.

What is claimed is:

1. The method of forming a stable, refractory metal resistance film on a dielectric substrate comprising:
   depositing on said dielectric substrate successive layers of a refractory metal of the desired resistance, and a noble diffusing metal in such quantity that will only substantially fill the grain boundaries of said refractory metal film; and
   heating the said layers in a vacuum at an elevated temperature to completely diffuse said diffusing metal into the grain boundaries of said refractory metal layer and stabilize the resistance of the said refractory metal layer.

2. The method of claim 1 wherein the source of said diffusing metal is a film deposited over said refractory metal.

3. The method of claim 1 wherein the source of said diffusing metal is a film deposited over said substrate prior to the deposition of said refractory metal thereover.

4. The method of claim 1 wherein the source of said diffusing metal is a film deposited between two layers of said refractory metal deposited over said substrate.

5. The method of forming a stable, refractory metal resistance film on a dielectric substrate comprising:
   depositing in a vacuum a thin refractory metal film to the desired sheet resistivity on said dielectric substrate;
   depositing over said refractory metal film in a vacuum a thin noble diffusing metal film in such quantity that will only substantially fill the grain boundaries of said refractory metal film;
   said depositing steps being accomplished in an uninterrupted sequence without removing the vacuum; and
   heating the combination of films in a vacuum at an elevated temperature to completely diffuse said diffusing metal into the grain boundaries of said refractory metal layer and stabilize the resistance of the said refractory metal film;

6. The method of forming a stable, refractory metal resistance film on a dielectric substrate comprising:
   depositing in a vacuum a thin refractory metal film to the desired sheet resistivity on said dielectric substrate;
   depositing over said refractory metal film in a vacuum a thin diffusing metal film from the group consisting of gold, silver, palladium and platinum in such quantity that will only substantially fill the grain boundaries of said refractory metal film;
   said depositing steps being accomplished in an uninterrupted sequence without removing the vacuum; and
   heating the combination of films in a vacuum at an elevated temperature to completely diffuse said diffusing metal into the grain boundaries of said refractory metal layer and stabilize the resistance of the said refractory metal film.

7. The method of forming a stable, refractory metal resistance film on a dielectric substrate comprising:
   depositing in a vacuum a first thin refractory metal film on said dielectric substrate;
   depositing over said refractory metal film in a vacuum a thin diffusing metal film from the group consisting of gold, silver, palladium and platinum in such quantity that will only substantially fill the grain boundaries of said refractory metal film;
   depositing in a vacuum a second thin refractory metal film of the identical composition of the first over said diffusing metal film whereby the combined thickness of the first and second metal film produces the desired sheet resistivity;
   said depositing steps being accomplished in an uninterrupted sequence without removing the vacuum; and
   heating the combination of films in a vacuum at an elevated temperature to completely diffuse said diffusing metal into the grain boundaries of said refractory metal layer and stabilize the refractory metal of the said resistance film.

8. The method of forming a stable, refractory metal resistance film on a dielectric substrate comprising:
   depositing on said dielectric substrate in a vacuum a thin diffusing metal film from the group consisting of gold, silver, palladium and platinum in such quantity that will only substantially fill the grain boundaries of said refractory metal film;
   depositing over said diffusing metal film a thin refractory metal film to the desired sheet resistivity;
   said depositing steps being accomplished in an uninterrupted sequence without removing the vacuum; and
   heating the combination of films in a vacuum at an elevated temperature to completely diffuse said diffusing metal into the grain boundaries of said refractory metal layer and stabilize the resistance of the said refractory metal film.

9. The method of forming a stable, refractory metal resistance film on a dielectric substrate comprising:
   depositing over said dielectric substrate in a vacuum a thin film of an intimate mixture of a major portion of refractory metal and a minor portion of a diffusing metal from the group consisting of gold, silver and platinum in such quantity that will only substantially fill the grain boundaries of said refractory metal film;
   said deposited film being deposited to the desired sheet resistivity; and
   heating the said deposited film in a vacuum at an elevated temperature to completely diffuse said diffusing metal into the grain boundaries of said refractory metal layer and stabilize the resistance of the said film.

10. A stable, refractory metal resistance film made by the method of claim 13.

11. The method of claim 13 wherein the said refractory metal is tantalum.

12. The method of forming a stable, refractory metal resistance film on a dielectric substrate comprising:
   depositing on said dielectric substrate successive layers of a refractory metal of the desired resistance, and a diffusing metal from the group consisting of gold, silver, palladium and platinum in such quantity that will only substantially fill the grain boundaries of said refractory metal film; and
   heating the said layers in a vacuum at an elevated temperature to completely diffuse said diffusing metal into the grain boundaries of said refractory metal layer and stabilize the resistance of the said refractory metal layer.

13. The method of forming a stable, refractory metal resistance film on a dielectric substrate comprising:
   depositing a thin film of a refractory metal of the desired resistance, and a noble diffusing metal over said dielectric substrate; and
   heat treating the metals to diffuse said noble diffusing metal into the grain boundaries of said metal and stabilize the resistance of said refractory metal;
   said quantity of diffusing metal being equal to between about 9.2 and 5.8 percent by volume of the composite volume of refractory and diffusing metals.

14. The method of forming a stable, tantalum metal resistance film on a dielectric substrate comprising:

depositing a thin film of a tantalum metal of the desired resistance, and an oxidation resistant diffusing metal from the group consisting of gold, silver, palladium and platinum over said dielectric substrate; and heat treating the metals to diffuse said oxidation resistant diffusing metal into the grain boundaries of said metal and stabilize the resistance of said tantalum metal;

said quantity of diffusing metal being equal to between about 9.2 and 5.8 percent by volume of the composite volume of tantalum and diffusing metals.

References Cited by the Examiner
UNITED STATES PATENTS

| | | | |
|---|---|---|---|
| 2,799,600 | 7/1957 | Scott | 117—229 X |
| 3,056,937 | 10/1962 | Pritikin | 29—155.7 X |

FOREIGN PATENTS 675,731   5/1939   Germany.

JOSEPH B. SPENCER, *Primary Examiner.*
RICHARD D. NEVIUS, *Examiner.*